April 30, 1957 E. C. SHAW ET AL 2,790,456
STEAM TRAP
Filed Sept. 14, 1953 3 Sheets-Sheet 1
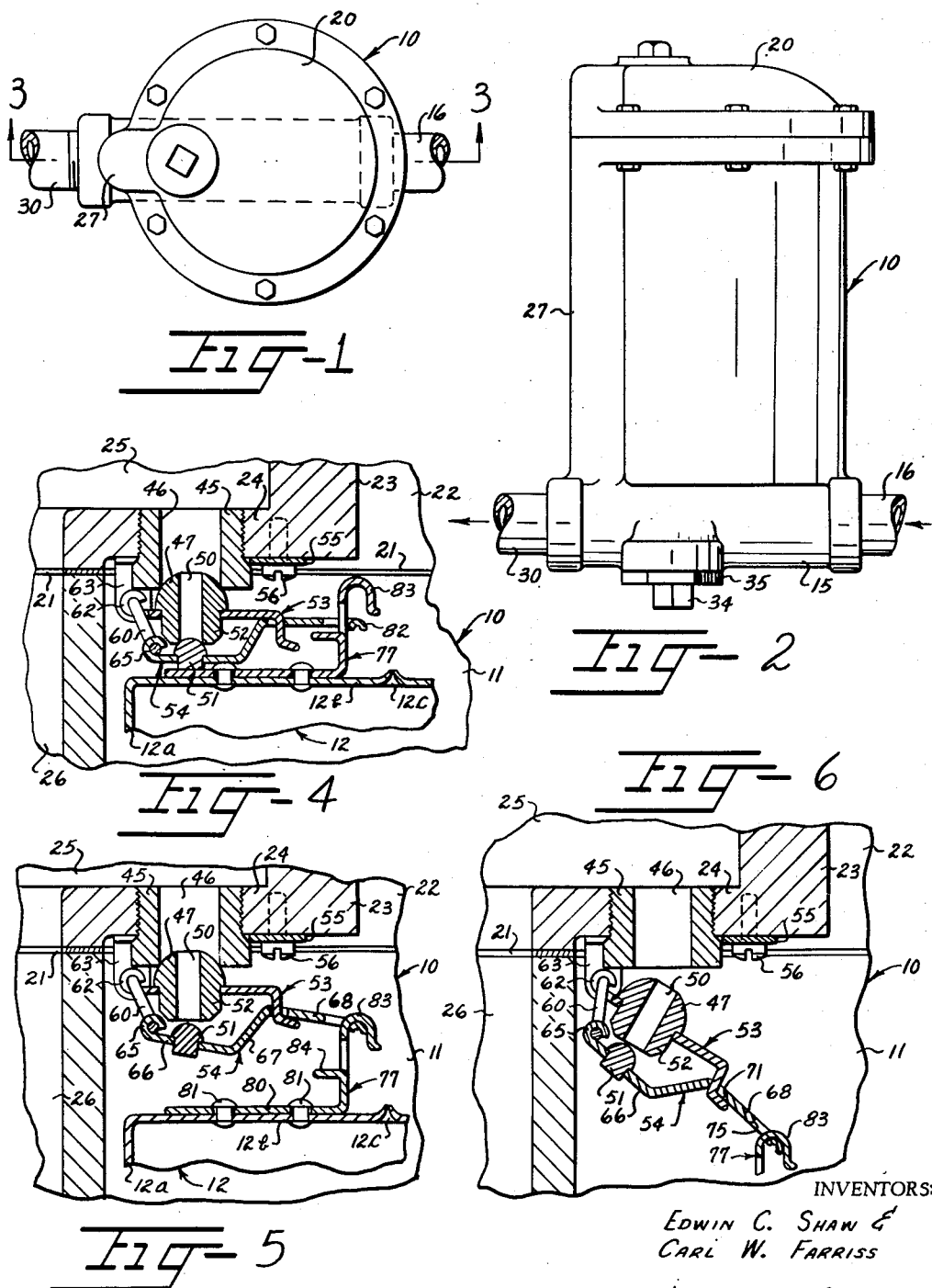
INVENTORS:
EDWIN C. SHAW &
CARL W. FARRISS
BY Eaton & Bell
ATTORNEYS.

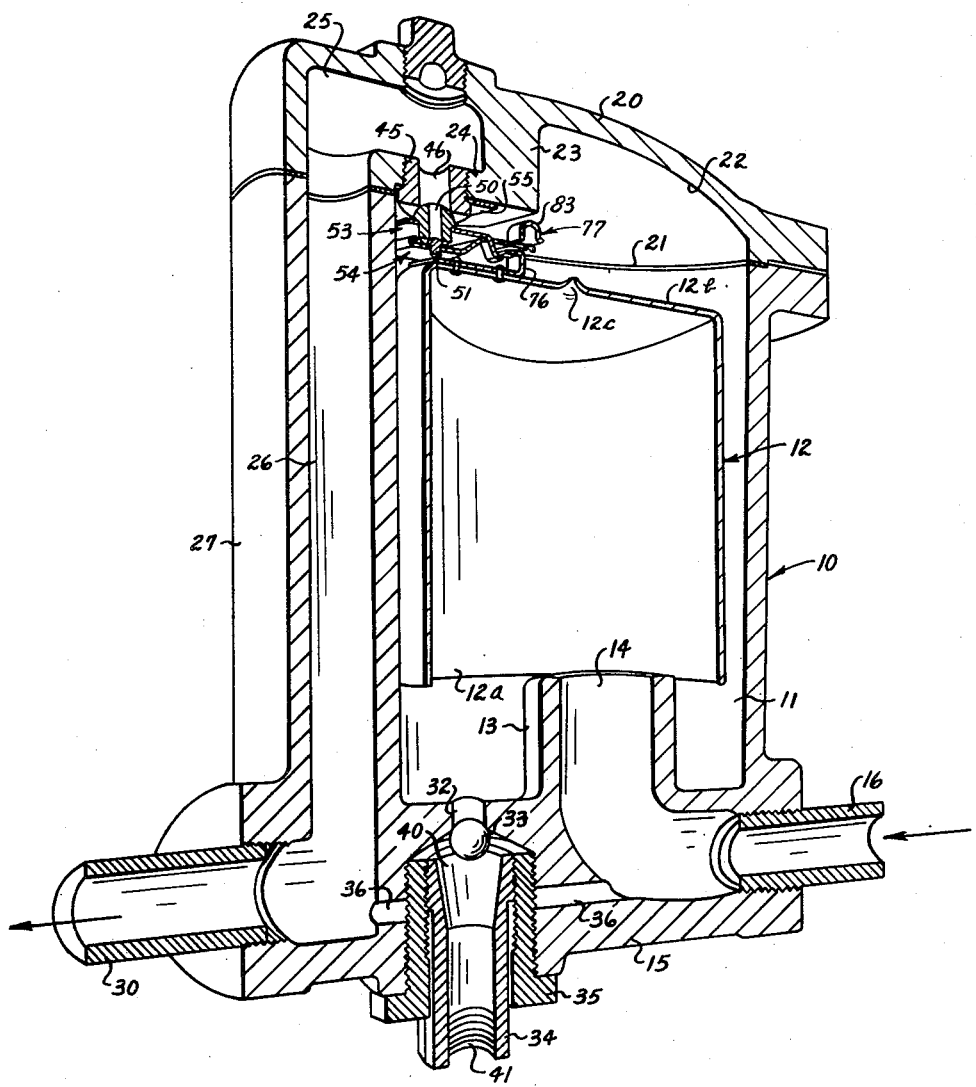

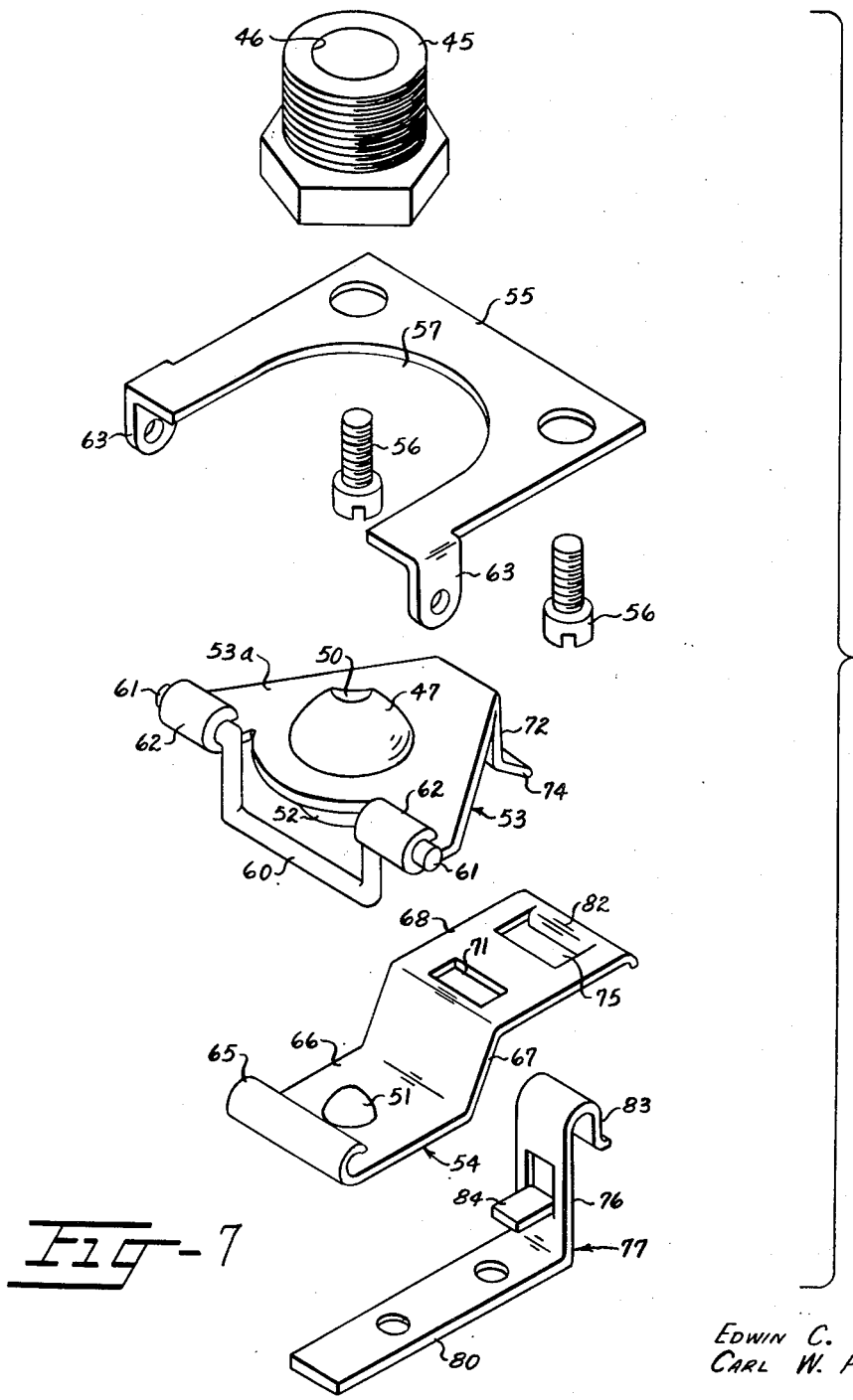

2,790,456
Patented Apr. 30, 1957

United States Patent Office

2,790,456
STEAM TRAP

Edwin C. Shaw and Carl W. Farriss, Charlotte, N. C., assignors to Perfecting Service Co., Charlotte, N. C., a corporation of North Carolina Application September 14, 1953, Serial No. 379,852

10 Claims. (Cl. 137—184)

This invention relates to traps or valves for steam systems, compressed air systems, pressurized gas systems and the like, and, more especially, to an improved valve mechanism for controlling the opening and closing of a valve in a pressure line.

It is the primary object of this invention to provide an improved valve mechanism for steam traps and the like which is of simple and economical construction and whose operating efficiency far surpasses that of valve mechanisms currently in use with steam traps in that a single valve made according to this invention is capable of being used with widely varying steam pressures and widely varying condensate capacities while traps now in use require a multiplicity of valves for various conditions.

Heretofore, in order to determine the size of steam traps or the valves therein required for a particular steam line or condition, it has been necessary to determine the number of pounds of condensate to be discharged per hour, the safety factor to use, and the pressure differential between the trap inlet line and the trap discharge line. After the latter factor had been determined, it has then been necessary to carefully calculate the size of the discharge orifice with which the steam trap must be provided, so as to continuously discharge the predetermined number of pounds of condensate per hour from the steam trap. It is evident, therefore, that the capacity of the continuous discharge capacity of a steam trap is limited by the size of the condensate discharge orifice, with the result that types of steam traps currently in use do not operate efficiently for the purpose intended under widely variable pressure conditions. Heretofore, where there has been a wide variation in the steam pressure, traps have had to be selected with valves therein of sufficient capacity to accommodate the lowest possible pressures and still be provided with enough capacity to open the condensate discharge orifice at the maximum pressure differential.

This has necessitated that the distributor or manufacturer of steam traps stock a substantial number of traps or valves therefor of a given size and characteristic which would differ from each other only as to the size of the condensate discharge orifice in the corresponding valve mechanism. This makes it practically impossible to use a single trap for more than one very limited use.

It is therefore another object of this invention to provide an improved valve mechanism for steam traps of the inverted bucket float type which is capable of use under variable pressure conditions and wherein a main or primary valve seat member is provided which has a relatively large discharge orifice and which is normally closed by a relatively large primary or main valve member having an axial orifice therethrough of substantially less cross-sectional area than that of the orifice in the primary valve seat member. The end of the orifice in the main valve member opposite from the end of the main valve member which seats against the orifice of the main valve seat member is normally closed by a relatively small pilot valve and the main valve and the pilot valve are interconnected by suitable linkage which is controlled by the usual type of condensate responsive element, such as a bucket float, so that, upon condensate initially accumulating in the trap, the condensate responsive element initially unseats the pilot valve only to permit the condensate to escape through the orifice in the main valve and thence through the orifice in the main valve seat. The relatively small orifice in the main valve operating alone would permit only a relatively small number of pounds of condensate to be discharged per hour therethrough. However, additional movement of the float element causes the main valve to be unseated from the main valve seat to permit a greater amount of condensate to be discharged during a given period of time due to the relatively larger cross-sectional area of the discharge orifice in the main valve seat.

It is evident that, when the pilot valve and the main valve are both closed, the interior pressure of the steam trap is relatively high as compared to the exterior pressure at the opposite side of the valve and the interior pressure in the steam trap normally tends to hold the valve mechanism in closed position. Thus in conventional traps, sufficient condensate must be accumulated to move the float sufficiently to overcome such pressure. By providing a pilot valve according to the present invention a relatively small orifice is closed as compared to the main discharge orifice, it is evident that less pressure is required to move the pilot valve away from the orifice in the main valve than would be required to move the main valve away from the main discharge orifice. Upon the pilot valve opening and condensate flowing through the orifice in the main valve, interior and exterior pressures are substantially equalized thus causing the main valve to open without any appreciable movement of the condensate responsive element. Additional movement of the condensate responsive element will however cause further opening of the main valve.

Some of the objects of the invention having been stated, other objects will appear as the description proceeds, when taken in connection with the accompanying drawings, in which—

Figure 1 is a top plan view of one form of the improved steam trap;

Figure 2 is a side elevation of the improved steam trap looking up at the lower side of Figure 1;

Figure 3 (Sheet 2) is a longitudinal vertical sectional and perspective view taken along line 3—3 in Figure 1 showing the improved valve mechanism in closed position with the bucket in elevated position;

Figures 4, 5 and 6 (Sheet 1) are enlarged sectional views of the improved valve mechanism in the upper central portion of Figure 3 showing the same in different positions;

Figure 7 is an exploded isometric view of the form of the improved valve mechanism shown in Figures 3 to 6, inclusive, disassociated from the trap.

Referring more specifically to the drawings, the numeral 10 broadly designates the body or housing of a steam trap which is commonly known as an inverted bucket type steam trap and with which the present invention is particularly adapted to be used. The body or housing 10 has a relatively large primary chamber or condensate or air dispersing chamber 11 therein in which an inverted bucket 12 is loosely disposed, and which has free vertical movement therein. The bucket 12 includes a cylindrical wall member 12a and a top wall 12b which is provided with a small vent or aperture 12c. The bottom wall of the chamber 11 has an upwardly projecting portion 13 thereon which is provided with an inlet passageway 14, which passageway extends downwardly into a relatively narrow and elongated in-line bottom portion 15 integral with the housing or body 10. The passageway 14 communicates with an ingress pipe or conduit 16 suitably secured to the body 10, as by being threaded thereinto. The pipe 16 may lead from any type of apparatus or line through which fluid such as air, steam, gas or condensate is directed under pressure so the fluid enters the chamber 11 in the body 10 under pressure.

The steam trap also includes a cap 20 which is suitably secured to the upper end of the body 10, a suitable gasket 21 being provided between the cap 20 and the body 10. The cap 20 is provided with a chamber 22 which coincides with, and may be considered a part of, the chamber 11. The cap 20 has a downwardly projecting portion 23 in the central portion thereof which forms a partition 24 in the cap 20. The cap 20 is provided with a passageway or secondary chamber 25 therein which is partially defined by the projection 23 and the partition 24. The chamber 25 communicates with an elongated discharge passageway 26 formed in a relatively narrow longitudinally or vertically extending portion 27 integral with the body 10. The end of the bottom portion 15 opposite from that end to which the pipe 16 is connected has a discharge pipe 30 suitably connected thereto, as by being threaded thereinto, and which pipe 30 communicates with the lower end of the chamber or discharge passageway 26.

In order to facilitate cleaning the chamber 11, the bottom wall is preferably provided with a cleaning vent or blow-off port 32 having a novel blow-off valve therein including blow-off ball 33 which seats against the port 32, this ball 33 being held in seated position by an inner blow-off plug 34 which is threadably mounted in an outer blow-off plug 35. The outer blow-off plug 35 is threadably embedded in the lower portion of the in-line projection 15 on the lower portion of the body 10 and normally prevents fluid from passing through a relatively small in-line passageway 36 provided in the portion 15 of the body 10 and which establishes communication between the passageways 14 and 26 when the outer blow-off plug 35 is opened beyond the line 36.

The inner blow-off plug 34 has a tapered passageway 40 therein which is generally elliptical or rectangular, that is of less width in one direction than the diameter of the ball 33 to thereby support the ball 33, but to permit fluid to flow downwardly through the port 32, past the ball 33 and into the passageway 40 when the inner blow-off plug 34 is loosened. The inner blow-off plug 34 also has a passageway 41 therein which communicates with the lower end of the passageway 40 and to which a discharge pipe, not shown, may be connected, if desired.

Although the inlet and discharge pipes 16 and 30 are shown as being in substantially axial alinement with each other in Figures 1, 2 and 3, it is to be distinctly understood that the inlet and outlet pipes 16 and 30 may be disposed in off-set relationship or the pipe 30 may be communicatively connected directly to the cover 20 and extend in perpendicular relationship to the pipe 16 and communicate directly with the secondary chamber or discharge passageway 25 in the cover 20. Of course, in the latter instance, the passageway 26 could be omitted.

The steam trap is shown by way of illustration, it being understood that the valve mechanism of this invention may be used in various types of pressure systems utilizing any fluid such as air, water, gas or the like and wherein it is desirable to have a relatively small pilot valve which is easy to open under pressure and which causes a more or less equalization of pressure on opposite sides of the valve to facilitate opening of the main valve. The invention comprises a pressure responsive valve within a valve.

The improved valve mechanism comprises a valve seat element or plug 45 which threadably penetrates the partition 24 in the cover 20 and is provided with a relatively large discharge orifice 46 therethrough normally closed by a main valve member 47. The main valve member 47 is generally hemispherical and has a relatively small longitudinally or vertically extending orifice 50 therethrough, the lower end of which forms a valve seat normally closed by a relatively small pilot valve 51 seated thereagainst as shown in Figure 4. The main valve member 47 has a reduced lower portion 52 integral therewith which penetrates the body portion 53a at a main valve lever 53 and is suitably secured therein, as by a pressed fit. The pilot valve 51 is also generally hemispherical and is provided with a reduced lower portion which penetrates a pilot valve lever 54, to which the pilot valve 51 is also suitably secured, as by being pressed thereinto.

One end of the lever 53 is pivotally connected to a bracket 55 suitably secured to the lower surface of the wall portion 24 of the cap 20, as by screws 56. The bracket 55 is cut-away to form an opening 57 therein through which the enlarged lower end of the main valve seat or orifice element 45 extends. The main valve lever 53 is pivotally connected to the bracket 55 by means of a substantially U-shaped link 60 having outwardly projecting portions 61 (Figure 7) on the free ends of the legs thereof partially surrounded by rolled over portions 62 integral with the body of lever 53. The opposite ends of the legs of the U-shaped link 60 loosely penetrate ears 63 on the bracket 55 and the lower horizontal portion of the link 60 extends through a rolled over portion 65 on the corresponding end of the pilot valve lever or link 54. Thus, the main valve lever 53 is pivotally connected to the bracket 55 and the pilot valve lever 54 is pivotally connected to the main valve lever 53 below the pivot points 63.

The pilot valve lever 54, has a lower flat or planar portion 66, an upwardly extending angularly disposed portion 67 integral therewith, and an outwardly bent upper planar portion 68. The planar portion 68 is thus disposed in spaced parallel relationship to the plane of portion 66 of the pilot valve lever 54. The distance between the upper surfaces of portions 66 and 68 is preferably such that, in closed position, the main valve lever 53 extends in substantially parallel relation to the portions 66 and 68 of the pilot valve lever 54 when the pilot valve member 51 is seated against the lower end of the orifice 50 in the main valve member 47 (see Figure 4).

The upper free end portion 68 of the pilot valve lever 54 has an intermediate opening 71 therethrough through which a downwardly formed leg portion 72 adjacent the free end of the main valve lever 53 loosely extends and which portion 72 has an outwardly bent foot portion 74 on the free lower end thereof which preferably extends at an angle relative to the main body poriton 53a of the main valve lever 53.

The flat free end portion 68 of the pilot valve lever 54 has a second opening or slot 75 formed adjacent the free end thereof and spaced outwardly from the opening 71 and through which the shank 76 of a hook or latch member broadly designated at 77 loosely extends. The hook member or latch member 77 is suitably secured to the upper surface of the top wall 12b of the inverted bucket 12 and, in this instance, the shank 76 has a right angular portion 80 formed integral therewith which is secured to the upper surface of the top wall of the inverted bucket 12, as by rivets 81.

The outer end of the opening 75 in the lever 54 is closed by, and defines, a catch bar portion 82 which is preferably formed with a convex upper surface as shown in Figures 3 to 7, inclusive, so that it may move freely in sliding contact with an inverted substantially U-shaped hook portion 83 formed on the upper end of the shank 76 of the hook or latch member 77. The medial portion of the shank 76 of the latch member 77 has an inwardly projecting tab portion 84 thereon which underlies the free end planar portion 68 of the pilot valve lever 54 and is adapted to engage the lower surface of the portion 68 of pilot valve lever 54 in the course of upward movement of the bucket or condensate responsive element 12 upon gas or steam initially entering the chamber 11 in the body 10 of the steam trap.

*Method of operation*

Prior to steam or gas initially being admitted to the chamber 11 in the body 10 of the trap, the lower edge of the cylindrical wall 12a of the bucket or condensate responsive element 12 rests upon or in close proximity to the bottom of the chamber 11 and the improved valve mechanism then occupies substantially the position shown in Figure 6. When steam under pressure is directed into the pipe 16 and, thence, into the chamber 11, a considerable amount of condensate generally precedes the steam and flows into the chamber 11 in advance of the raw steam. The bucket 12, being in lowered position, is initially elevated slightly by the pressure of the condensate entering the same and the condensate then passes beneath the lower edge of the cylindrical wall 12a of the bucket 12 and upwardly and is discharged through the discharge orifice 46 in the main valve seat member 45. Any air entering the bucket 12 in advance of the condensate escapes through the vent 12c and the orifice 46.

Raw steam enters the bucket 12 in back of the condensate thus forcing the condensate downwardly within the bucket and then upwardly between the cylindrical wall of the bucket 12 and outwardly through the valve until substantially all of the condensate is discharged from the chamber 11, through the main discharge orifice 46 in the main vave seat 45, through the chamber 25, the passageway 26 and thus through the discharge pipe 30. As more steam enters the bucket 12, condensate will be displaced causing the bucket or float 12 to rise. Upon substantially all of the condensate being discharged from the chamber 11, the raw steam elevates the bucket 12 to substantially the position shown in Figures 3 and 4 and in the course of which the tab portion 84 on the latch member 77 initially engages the lower surface of the portion 68 of the pilot valve lever 54 to seat the pilot valve 51 against the lower end of the relatively small discharge orifice 50 in the main valve 47. Continued upward movement of the bucket 12 causes upward movement of the main valve lever 53 as the lever 54 bears thereagainst.

Pressure in the chamber 11 gradually increases as compared to the pressure in the chamber 25, and the increased buoyancy of the bucket 12 due to increased steam in the trap causes the bucket 12 to move upwardly, which tends to move the main valve member 47 to closed position and, when the bucket 12 finally approaches fully raised position, the portion 80 of the latch member 77 or the rivet heads 81 engage the lower surface of the pilot valve member 51 or the lever 54 to thereby assist in tightly seating both the pilot valve member 51 and the main valve member 47 in closed position as shown in Figure 4. Thus, as long as steam substantialy free of condensate is entering the chamber or is present in the chamber 11, there is a relatively high pressure differential between the chamber 11 and the chamber 25 and the valve members 47 and 51 remain in closed position.

However, an additional condensate enters the chamber 11 and the interior of the bucket 12, the bucket 12 loses buoyancy, causing the portion 80 of the latch member 77 to move away from the lower end of the pilot valve member 51. However, the pressure differential between the chambers 11 and 25 still remains such that the valve members 47 and 51 will remain in closed position. This insures that raw steam will not escape from the trap. As the condensate in the chamber 11 further increases, and the bucket 12 further loses buoyancy, the hook portion 83 on the latch member 77 engages the catch bar portion 82 on the pilot valve lever 54 and thus swings the pilot valve lever downwardly to unseat the pilot valve member 51 as shown in Figure 5.

This is an important function of the improved valve mechanism, since the relatively small cross-sectional area of the orifice 50 in the main valve member 47 is such as to permit the pilot valve 51 to be moved downwardly under the weight of the bucket 12 although the pressure differential between the chambers 11 and 25 may be relatively high.

In conventional steam traps having a single valve and orifice, a particular size orifice may work very well for a desired rate of condensate discharge per hour but upon pressure increasing this valve will have to work against increased pressure and it is necessary to provide a smaller orifice and valve to maintain the same rate of condensate discharge. Thus a conventional trap has only limited usage and for variations in condensate capacity or pressure a different trap or different orifice must be used.

The valve of the present invention will work under varying conditions of pressure. Upon the valve 51 opening, the interior pressure in chamber 11 will decrease as condensate flows through the orifice 50. This reduces the pressure on the lower surface of the lever 53 and, in most instances, permits it to fall downwardly opening the valve 47. Under high pressure conditions it would require a substantial amount of pressure to open the main valve 47 but the smaller pilot valve is relatively easy to open and this tends to reduce the pressure differential making it easy to open the main valve.

In addition to the main valve being operable by variation in interior pressure, mechanical means are provided for opening the valve 47, said mechanical means comprising the foot portion 74 on the lever 53 which foot portion 74 is engaged by the lever 54 upon further opening movement of said lever. Thus downward movement of the bucket 12 will also pull the valve 47 open or, in most instances, will open it further after it has been initially opened due to the pressure differential created by the opening of the valve 51.

In some instances, when the proportion of the condensate entering the chamber 11 is relatively low as compared to the amount of steam entering the chamber 11, this condensate will quickly be discharged from the chamber 11, successively through the discharge orifices 50 and 46 in the main valve member 47 and the main valve seat 45, respectively, following which the buoyancy of the bucket 12 will again be increased as the amount of steam in proportion to the amount of condensate increases in the chamber 11 which will return the pilot valve member 51 to the closed position shown in Figure 4 without opening the valve 47. However, in the event of the condensate entering the chamber 11 being at a relatively high proportion to the amount of steam entering the chamber 11, the pilot valve 51 is initially unseated or opened in the manner heretofore described, but the size of the orifice 50 in the main valve member 47 would then be insufficient to permit the condensate to be discharged from the chamber 11 at as fast a rate as that at which the condensate is introduced into the chamber 11.

In order to obviate this circumstance, the increased amount of condensate in the chamber 11 permits the bucket to move downwardly further than is the case when only the pilot valve 51 is unseated or opened and as soon as the outer planar portion 68 of the pilot valve member 54 contacts the hook portion 74 on the main valve lever 53, it will impart downward movement to the main valve member and, in so doing, will unseat or open the main valve member 47. Thus, the condensate entering the chamber 11 of the trap at a relatively faster rate as compared to the amount of steam entering the chamber 11 is readily discharged through the relatively large main orifice 46 in the main valve seat 45, without substantially increasing the velocity at which the condensate passes through the orifice 46. Thus the valve will work satisfactory at various pressures and at various rates of condensate discharge per hour.

Of course, as the relatively large amount of condensate is discharged from the chamber 11 through the main discharge orifice 46, the amount of steam in proportion to the amount of condensate again increases to elevate the bucket 12 whereupon the pilot valve member 51 and the main valve member 47 are successively closed or seated in the manner heretofore described. It is evident that the valve members 47 and 51 and the bucket 12 will fluctuate as the amount of condensate varies in proportion to the amount of steam in the chamber 11 and the bucket 12.

In the above description of the method of operation of the improved valve mechanism, the proportions of steam and condensate are purposely exaggerated for purposes of clarity. Actually, the condensate is discharged from the chamber 11 substantially as fast as it collects in the chamber 11 thus keeping the unit to which the end of the pipe 16 remote from the trap, may be connected drained of condensate and full of hot, so-called, dry steam.

It is thus seen that we have provided an improved valve for use in pressure lines such as gas or steam traps which valve quickly responds to variations in condensate in the trap and wherein discharge orifices of successively increasing size are opened as the amount of condensate or the rate of flow of condensate in the traps increases so that either type of trap may be used in steam, gas or air lines or systems under widely varying pressure and flow conditions.

An important feature of the improved valve mechanism resides in the fact that, when the rate of flow of the condensate into the chamber of either type of trap is relatively slow, only the small auxiliary orifice in the main valve member is opened, thereby insuring that the condensate is discharged from the trap at a relatively slow rate and, consequently, preventing the gas, steam or compressed air from passing through the discharge orifice along with the condensate as would be the case in the event that the usual type of valve mechanism was employed and wherein the discharge orifice thereof was of such size as to accommodate pressures which varied only slightly below and above a predetermined pressure.

On the other hand, if the usual type of single orifice valve mechanism currently in use were employed and the discharge orifice thereof was of such size as to accommodate relatively low pressures and relatively small amounts of condensate in a given period of time, then, if the same trap were used in another line or in the same line under substantially greater pressure conditions than that for which it was originally designed, the valve mechanism could not discharge the condensate therefrom at a fast enough rate and the condensate would then back up in the steam, gas or air line or system with which the particular trap may be associated. However, the improved valve mechanism quickly and readily accommodates relatively higher than normal pressures and relatively higher than normal rate of flow of condensate.

In the drawings and specification, there has been set forth a preferred embodiment of the invention, and although specific terms are employed, they are used in a generic and descriptive sense only, and not for purposes of limitation, the scope of the invention being defined in the claims.

We claim:

1. In a condensate trap for steam lines and the like having a body provided with a body chamber therein and inlet and outlet passageways communicating with the body chamber, a movable condensate responsive element loosely disposed in said body chamber and being operable to move in one direction under steam pressure and to move in the opposite direction as the amount of condensate in the body chamber increases relative to the amount of steam; an improved valve mechanism comprising a valve seat member having a discharge orifice communicating with the interior of said body chamber, a main valve lever pivotally supported at one end thereof within said body chamber adjacent said discharge orifice, a pilot valve lever pivotally connected at one end thereof to the main valve lever, a main valve member carried by and extending through the main valve lever and having a relatively small auxiliary discharge orifice therethrough, said main valve member being adapted to seat against the corresponding end of the valve seat member for closing the corresponding end of the discharge orifice therein, a pilot valve carried by the pilot valve lever and adapted to seat against the end of the main valve member remote from the main valve seat for closing the corresponding end of the auxiliary discharge orifice, pilot lever engaging means carried by the condensate responsive element and being adapted to impart movement to the pilot lever upon an increase in the amount of condensate relative to the amount of steam in the body chamber to thereby unseat the pilot valve and to permit the condensate to be discharged through the auxiliary orifice, and additional movement of the pilot lever causing the main valve lever to move to unseat the main valve member and to thereby permit the condensate to be discharged directly from the body chamber through the main discharge orifice.

2. In a condensate trap for steam lines and the like having a body provided with a main chamber therein and inlet and outlet passageways communicating with the main chamber, a vertically movable condensate responsive element loosely disposed in said main chamber and being operable to move upwardly under steam pressure and to move downwardly as the amount of condensate in the main chamber increases relative to the amount of steam in the main chamber, an improved valve mechanism comprising a valve seat member having a discharge orifice communicating with the interior of said main chamber, and disposed above the condensate responsive element, a main valve lever pivotally supported at one end thereof and etxending beneath the discharge orifice in the main valve seat member, a pilot valve lever having a portion extending beneath the main valve lever, a link pivotally connecting the pivoted end of the main valve lever to the corresponding end of the pilot valve lever, a main valve member carried by and extending through the main valve lever and having a relatively small auxiliary discharge orifice therethrough disposed in substantial alinement with the main discharge orifice in the main valve seat member, said main valve member being adapted to seat against the corresponding end of the main valve seat member for closing the corresponding end of the main discharge orifice, a pilot valve carried by the pilot valve lever and adapted to seat against the end of the main valve member remote from the main valve seat for closing the corresponding end of the auxiliary discharge orifice, means limiting relative movement between the pilot valve lever and the main valve lever, pilot lever engaging means carried by the condensate responsive element and being adapted to engage and impart downward movement to the pilot valve lever in the course of downward movement of the condensate responsive element as affected by increasing amounts of condensate relative to the amount of steam in the main chamber to thereby unseat the pilot valve and to permit the condensate to be discharged successively through the auxiliary orifice and the main orifice, and said limiting means being so arranged that a predetermined amount of downward movement by the pilot lever will impart downward movement to the main valve lever to unseat the main valve member and to thereby permit the condensate to be discharged directly from the main lever through the main discharge orifice.

3. In a condensate trap for steam lines and the like having a body provided with an inlet chamber and a discharge chamber and a first orifice connecting said chambers, a movable condensate responsive element loosely disposed in said inlet chamber and movable in one direction under steam pressure and in the other direction as the amount of condensate in the inlet chamber increases relative to the amount of steam therein, an improved valve mechanism comprising a main valve lever pivotally supported at one end thereof adjacent said orifice, a pilot valve lever having a portion extending in spaced juxtaposed relation to the main valve lever, a link pivotally connecting the pivoted end of the main valve lever to the corresponding end of the pilot valve lever, a main valve carried by and extending through the main valve lever and having a relatively small auxiliary discharge orifice therethrough, said main valve being adapted to seat against and close the first orifice, a pilot valve carried by the pilot valve lever and adapted to seat against and close the auxiliary discharge orifice, means on the main valve lever engageable by the pilot valve lever upon predetermined movement of the pilot valve lever, pilot valve lever engaging means carried by the condensate responsive element for moving the pilot valve lever away from the main valve lever upon movement of the condensate responsive element as affected by an increased proportion of condensate to steam in the main chamber to thereby unseat the pilot valve and to permit the condensate to be discharged through the auxiliary orifice, and predetermined movement of the pilot valve lever imparting movement to the main valve lever to unseat the main valve and to thereby permit the condensate to be discharged through the first discharge orifice, and means on said pilot valve lever engaging means for engaging said pilot valve lever to impart opposite movement thereto upon opposite movement of said condensate responsive element to close both of said valves.

4. In a steam trap having an intake chamber and an outlet chamber adjacent the upper portion of the intake chamber and an orifice connecting said chambers and also having an inverted bucket float member in said intake chamber movable upwardly upon action of steam within said chamber and downwardly upon the proportion of condensate to steam increasing; improved means for opening and closing said orifice to allow condensate to flow therethrough comprising a self-seating main valve hingedly supported adjacent said orifice and movable against the lower side of said orifice to open and close the same, said main valve having a relatively small orifice therethrough, a pilot valve hingedly interconnected with the main valve and movable against the lower side of the relatively small orifice to open and close the same, said valves being urged to open position by gravity, means connected to said bucket float for closing both valves upon upward movement of said bucket float member by said steam and to open the pilot valve upon movement of the float member downwardly due to increased condensate in said intake chamber whereby the main valve will open by gravity upon the pilot valve being opened and pressure being substantially equalized in said chambers.

5. In a steam trap comprising a hollow housing having an inlet opening in the lower portion thereof and an outlet opening in the upper portion thereof, and an inverted bucket float member within said housing movable upwardly upon action of steam therewithin and downwardly upon the proportion of condensate to steam increasing; improved means for opening and closing said outlet opening to allow condensate to flow therethrough comprising a first lever pivotally connected to said housing adjacent the outlet opening, a main valve carried by said first lever for opening and closing the outlet opening, said main valve having a relatively small orifice therethrough, a second lever articulated with the first lever, a pilot valve carried by the second lever for opening and closing the relatively small orifice, means connecting said bucket float member and said levers and operable to close both valves upon upward movement of said bucket float member by said steam and to open the pilot valve upon movement of the float member downwardly due to increased condensate within said housing whereby the main valve will open by gravity upon the pilot valve being opened and pressure being substantially equalized on both sides of said outlet opening.

6. A structure according to claim 5 wherein the main valve comprises a semi-spherical self-seating member.

7. A structure according to claim 5 wherein the main valve and the pilot valve each comprise semi-spherical self-seating members.

8. A structure according to claim 5 wherein the connection between the bucket float member and the levers is a loose connection permitting relatively small movement of said bucket float member without corresponding movement of said levers.

9. In a steam trap comprising a hollow housing having an inlet opening in the lower portion thereof and an outlet opening in the upper portion thereof, and an inverted bucket float member within said housing movable upwardly upon action of steam therewithin and downwardly upon the proportion of condensate to steam increasing; improved means for opening and closing said outlet opening to allow condensate to flow therethrough comprising a first lever pivotally connected to said housing adjacent the outlet opening, a main valve carried by said first lever for opening and closing the outlet opening, said main valve having a relatively small orifice therethrough, a second lever articulated with the first lever, a pilot valve carried by the second lever for opening and closing the relatively small orifice, means on said bucket float member engageable with at least one of said levers for closing both valves upon upward movement of said bucket float member by said steam, said means on the bucket float member having a portion thereof loosely penetrating said second lever and having means on the free end thereof for engaging said second lever upon predetermined downward movement of the float member due to increased condensate within said housing to move the second lever downwardly to open the pilot valve whereby the main valve will open by gravity upon the pilot valve being opened and pressure being substantially equalized on both sides of said outlet opening.

10. A structure according to claim 9 wherein the first lever has a portion loosely penetrating the second lever with means on the free end thereof engageable by the second lever upon predetermined downward movement of the second lever to move the first lever downwardly to open the main valve regardless of the pressure differential at said outlet opening.

References Cited in the file of this patent

UNITED STATES PATENTS

| | | |
|---|---|---|
| 843,019 | Johnston | Feb. 5, 1907 |
| 2,024,774 | Mastenbrook | Dec. 17, 1935 |
| 2,586,143 | Baker et al. | Feb. 19, 1952 |

FOREIGN PATENTS

| | | |
|---|---|---|
| 412,448 | Great Britain | June 28, 1934 |